S. R. SHELDON.
ROTARY CONTROL FOR SPRAY HEADS FOR AIR WASHERS.
APPLICATION FILED JULY 30, 1912.
1,063,295.
Patented June 3, 1913.
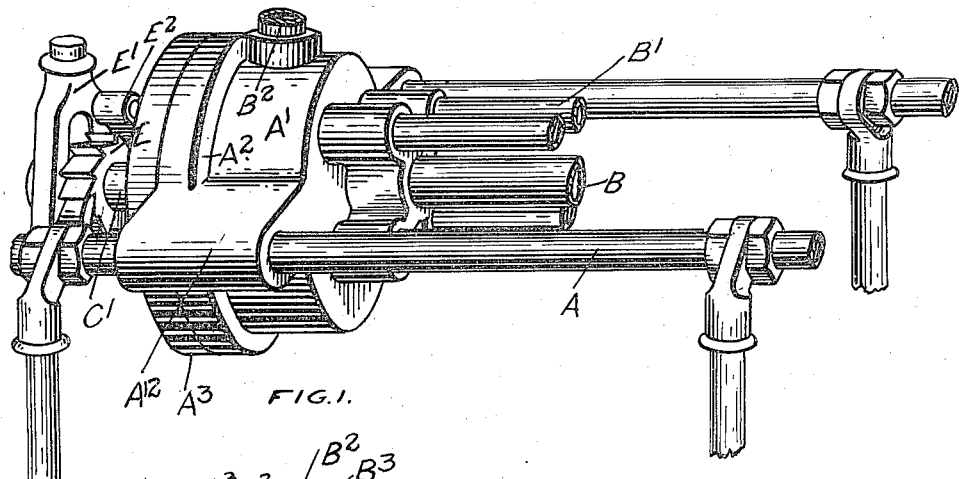
FIG.1.
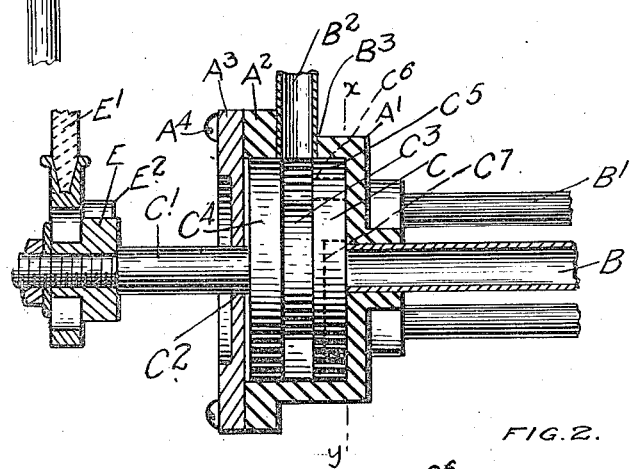
FIG.2.
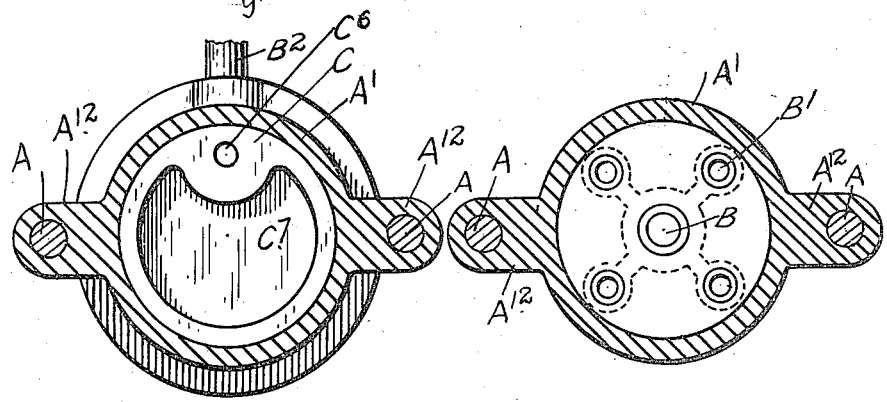
FIG.3.
FIG.4.
WITNESSES.
W. G. McIntosh
INVENTOR.
S. R. SHELDON
ATTYS.

UNITED STATES PATENT OFFICE.

SIDNEY RANDOLPH SHELDON, OF GALT, ONTARIO, CANADA.

ROTARY CONTROL FOR SPRAY-HEADS FOR AIR-WASHERS.

1,063,295.  Specification of Letters Patent.  Patented June 3, 1913.

Application filed July 30, 1912. Serial No. 712,343.

*To all whom it may concern:*

Be it known that I, SIDNEY RANDOLPH SHELDON, of the town of Galt, in the county of Waterloo, in the Province of Ontario, Canada, have invented certain new and useful Improvements in Rotary Controls for Spray-Heads for Air-Washers, of which the following is the specification.

My invention relates to improvements in rotary controls for spray heads for air washers, and the object of the invention is to devise a simple form of rotary control which will convey the water pressure successively to the spray heads (not shown) and relieve the pressure to the atmosphere and it consists essentially of an outer cylindrical casing, a relief pipe extending therefrom to the atmosphere and a pipe leading peripherally to the source of water supply and a series of pipes arranged circumferentially and leading to the spray heads, an inner rotary valve member having an annular groove extending around the periphery thereof, an opening extending through the flange forming one side of the groove in circumferential alinement with the pipe openings leading to the spray heads, a recess formed in the face of the rotary member opposite the relief pipe and into which the pipes leading to the spray heads normally communicates, and means for rotating the rotary member as hereinafter more particularly explained by the following specification.

Figure 1, is a general perspective view of my device. Fig. 2, is a vertical longitudinal section through the outer casing of my devince showing the rotary parts in full. Fig. 3, is a vertical section on line $x-x$ Fig. 2 and looking toward the rotary member. Fig. 4, is a sectional view of the same looking in the opposite direction.

In the drawings like letters of reference indicate corresponding parts in each figure.

A is a supporting frame.

A' is the cylindrical valve casing provided with lugs $A^{12}$ mounted upon the rods of the frame A. The stationary member A' is provided with a flange $A^2$ to which is secured a cover $A^3$ by screws $A^4$.

B is the relief pipe leading into the center of the stationary member and in alinement with the axis of rotation of the rotary member.

B' is a series of pipes arranged circumferentially around the pipe B and also leading in to the casing A'.

$B^2$ is a vertical supply pipe extending from the peripheral opening $B^3$ formed in the stationary casing A'.

C is the rotary member provided with the spindle C' extending through the opening $C^2$ formed in the cover $A^3$ of the stationary casing A'. The rotary member C is provided with a central circumferential groove $C^3$ formed by side annular flanges $C^4$ and $C^5$. The groove $C^3$ is arranged opposite the opening $B^3$ so that there is a direct connection between the pipe $B^2$ and the groove.

$C^6$ is an opening extending through the flange $C^5$ in circumferential alinement with the pipe openings B'.

$C^7$ is a recess formed in the face of the rotary member opposite the relief pipe B, such recess being of such a form that when the opening $C^6$ is opposite one of the pipe openings B', the remaining pipe openings B' communicates with the recess $C^7$ and through the recess to the relief pipe B.

E is a ratchet wheel mounted upon the spindle C' and E' is an operating lever provided with pawls $E^2$ designed to engage with the ratchet wheel E so as to impart a rotary movement thereto.

Although I show a ratchet and pawl mechanism for rotating the spindle C', it will, of course, be understood that any other means may be employed for imparting a rotary movement thereto.

Normally the water pressure merely extends into the groove $C^3$, the pressure in the pipes B' being relieved through the recess $C^7$ to the relief pipe B. In this position the opening $C^6$ is located between the upper two pipe openings B' indicated by dotted circle in Fig. 4. By rotating the member C the opening $C^6$ is brought opposite one of the openings B' allowing the pressure to extend through the opening $C^6$ and the pipe B' to one of the spray heads, the remaining pipe opening still being relieved through the recess $C^7$, to the pipe B to the atmosphere. It will thus be seen that as the rotary member revolves the pressure extends through the pipes B' to the spray heads successively and the pipes are successively relieved of the pressure.

From this description it will be seen that I have devised a very simple rotary device whereby water pressure to the spray heads of an air washer may be successively supplied and relieved so as to operate the flushing mechanism of the spray heads, the pipes leading to the spray heads remaining full of water.

What I claim as my invention is:

1. In a rotary control for spray heads for air washers, an outer stationary cylindrical member, a supply pipe leading into the periphery of the stationary member, and a relief pipe leading axially therefrom, and a series of pipes leading from the stationary member and arranged circumferentially around the relief pipe, a rotary member held within the stationary member, and means in the rotary member for successively establishing communication between the pipes leading from the stationary member and the supply pipe and means for normally establishing communication between the relief pipe and the said pipes leading from the stationary member, and means for rotating the rotary member as and for the purpose specified.

2. In a rotary control for spray heads for air washers, a cylindrical casing, a supply pipe leading peripherally therefrom, a relief pipe leading axially therefrom, a series of pipes arranged circumferentially around the relief pipe, a rotary member having a peripheral annular groove with which the supply pipe communicates, and an opening leading from the annular groove circumferentially in alinement with the openings of said series of pipes, and a recess formed in the base of the rotary member opposite the relief pipe and with which the openings of said series of pipes normally communicate, and means for rotating the rotary member, as and for the purpose specified.

3. In a device of the type described a casing, a rotary member within said casing, having a peripheral annular groove, said rotary member also having a lateral passage communicating with said groove, said casing having a supply pipe communicating with the peripheral annular groove of said rotary member, said rotary member also having a recess of mutilated cylindrical outline, the mutilated outline being opposite said lateral passage, a plurality of pipes normally communicating with said recess, said lateral passage adapted to be successively brought into communication with the last mentioned pipes, a relief pipe communicating with said recess and means for actuating said rotary member.

In testimony whereof I affix my signature in presence of two witnesses.

SIDNEY RANDOLPH SHELDON.

Witnesses:
ROBERT DONALDSON,
J. A. STEPHENSON.